July 24, 1951  G. B. MOLLRING  2,562,149
ASPHALT PELLETIZER
Filed April 17, 1947
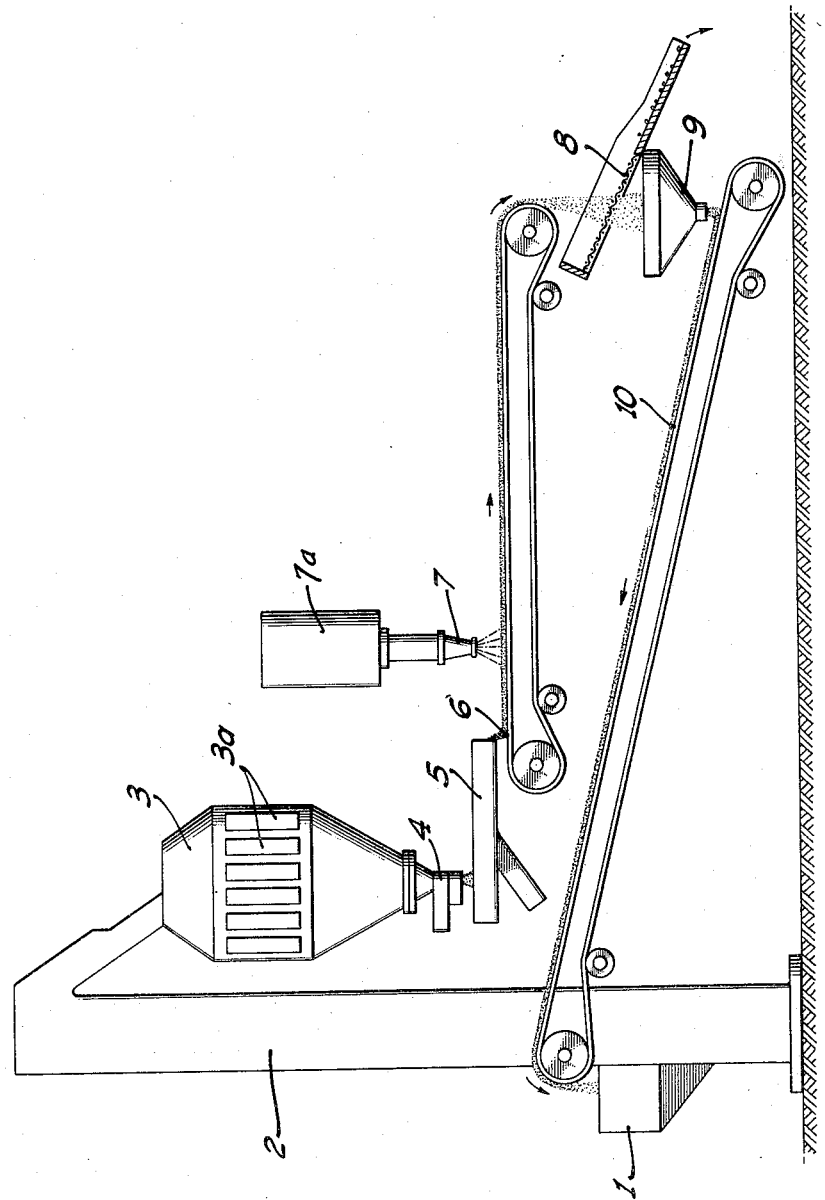
INVENTOR
Gilman B. Mollring Patented July 24, 1951

2,562,149

UNITED STATES PATENT OFFICE 2,562,149

ASPHALT PELLETIZER

Gilman B. Mollring, Los Angeles, Calif.

Application April 17, 1947, Serial No. 742,149

7 Claims. (Cl. 18—2.4)

This invention relates to an apparatus for transmuting a hot liquid asphalt into a multiplicity of tiny, cold, solid pellet-like particles of asphalt which are coated with a pulverulent material to inhibit coalescence.

Solid asphalt is both difficult and expensive to package and handle, since it is usually sold in wooden barrels, steel drums, clay lined paper bags or hexagonal cartons, etc. It is desirable therefore to provide some means whereby asphalt may be handled either in bulk or returnable containers.

It is an object of this invention to supply an apparatus whereby solid asphalt may be divided into small particles or pellets which are coated with a pulverulent material, and thereby become stable to storage and susceptible of convenient handling.

Briefly, the invention comprises a substantially horizontal moving belt upon which a bed of the pulverulent coating material is deposited, and means for springling the molten asphalt on the moving bed of coating material so that it becomes divided into particles which are coated with the powdered material, and is also cooled by the coating material. The coated pellets are then separated from the excess powdered coating material, and the latter is cooled and recycled.

The invention may be best understood by reference to the attached drawing, which illustrates a suitable form of apparatus.

Referring to the drawing, the powdered coating material, which in this example will be referred to as clay, is stored in bin 1 from which it is elevated by elevator 2 to cooler 3 which may be equipped with ventilators 3a or other means for indirect cooling of the clay. The cooled clay is fed at a uniform rate by means of feeder 4 to spreader 5, which may be a shaker or any other means for spreading a uniform layer or bed of the clay on moving belt 6. The asphalt to be pelletized is introduced into heater 7a where it is melted and brought to a temperature sufficiently high to make it suitably fluid. It is then passed through nozzle 7 which serves to sprinkle the liquid asphalt on the bed of clay on belt 6. The asphalt is thus broken up into droplets which are thoroughly coated with clay while warm and sticky, and are cooled by contact with the excess clay during the succeeding conveyance on belt 6. From belt 6 the pellet-clay mixture is dropped through inclined screen 8 which serves to separate the pellets and provide a means for their withdrawal. The excess clay passes through screen 8 and funnel 9 onto return conveyor 10 which serves to return it to bin 1 for recycling through the apparatus as above described. Fresh clay and asphalt are added to bin 1 and heater 7a as required. The apparatus may be enclosed to protect the operator from dust if desired.

In a specific example of the apparatus described a belt 6 was employed which was approximately 14 inches wide and thirty feet long beyond the point of addition of the asphalt. The belt was moving at a rate of about 10 feet per second, and was covered with a substantially uniform bed of powdered mica which was added thereto at a rate of about 500 pounds per minute. The asphalt, which was an air blown asphalt of about 250° F., (R & B) was heated to a temperature of about 350° F. and sprayed under nitrogen pressure through a fan shaped nozzle, at a rate of about 70 pounds per minute. The nozzle opening was about $\frac{1}{16}$ inches wide and about 2 inches long at its outer end, and was tapered at about 35° angle to provide a fan shaped spray. The nozzle opening was about 20 inches above the conveyor belt.

It was found that in an apparatus of the above type, pellets of asphalt of about 10 mesh could be produced, which were coated with powdered mica for example, the coating material amounting to approximately 10% of the weight of the asphalt. The coated pellets were readily stored and very easily handled.

It is to be understood, of course, that many variations may be made in the above specific example of the apparatus. The elevator may be any means for elevating the clay, as for example a continuous conveyor of the bucket type, or a gas lift or pneumatic conveyor. The cooler may be any type suitable for cooling the solid powdered clay. If a gas lift elevator system is employed, the cooling and gas lift may be accomplished simultaneously by employing a cool gas in the lifting operation. The heating of the asphalt should be sufficient to melt it and reduce its viscosity sufficiently so that it may be separated into one or more fine streams by nozzle 7. Preferably, nozzle 7 should be far enough from belt 6 so that the fine stream breaks up into droplets before striking the bed of clay, although it has been found that the apparatus will serve to break the stream up into pellets even after it has reached the clay bed. The clay should, of course, be in a sufficient excess to cover the entire pellet and also provide a further bed as a cushion and a cooling means.

The length of belt 6 beyond a point at which the asphalt is applied should be sufficient to provide cooling of the coated pellets by the excess clay to a temperature below its melting point or to an extent sufficient to prevent agglomeration of the pellets on screen 8. Screen 8, of course, may be substituted by a classifier or elutriator or other means of separating the coated pellets from the residual clay. The latter may be returned to bin 1 by any suitable conveyor means.

Although clay and mica were employed as the coating materials in the above description, any suitable coating material may be employed. Preferably the material is powdered, i. e., divided into particles not greater than approximately 100 mesh in size. The coating material may consist in whole or part of clay, ground mica, lime, talc, or similar mineral materials or it may consist in whole or part of powdered gilsonite, natural rock asphalt or similar material having a general thermoplastic nature of a relatively high melting point.

The asphalt to be pelletized may be any asphalt which is solid at room temperatures, such as air blown asphalts or steam refined asphalts.

Modifications of this invention which would occur to one skilled in the art may be employed and these are to be included in the scope of the invention as defined in the following claims.

I claim:

1. An apparatus for forming pellets of asphalt which are coated with a coating material, which comprises a substantially horizontal moving belt, means for applying a substantially uniform bed of powdered coating material thereon, means for sprinkling molten asphalt on said bed of coating material, solids separator means for separating the resulting coated pellets from the excess coating material, solids cooler means and solids conveyor means for recycling the cooled separated coating material to said moving belt.

2. An apparatus according to claim 1 in which the length of the belt beyond the point of addition of the asphalt is sufficient to provide cooling of the asphalt pellets to a temperature below the melting point of the asphalt.

3. An apparatus according to claim 1 in which the means for applying the coating material to the belt comprise a feeder capable of maintaining a constant feed rate, and a spreader capable of spreading a uniform bed on the belt.

4. An apparatus according to claim 1 in which the means for sprinkling the asphalt comprises a nozzle capable of delivering a fan-shaped stream toward the moving belt.

5. An apparatus for forming pellets of asphalt which are coated with a coating material so as to prevent agglomeration thereof, which comprises a storage bin for powdered coating material, an elevator adapted to elevate the coating material from the storage bin, a cooler adapted to receive coating material from the upper portion of the elevator and cool it while allowing it to pass continuously downward by gravity therethrough, a feeder attached to the lower portion of said cooler adapted to regulate the flow of coating material therethrough, a shaker for receiving coating material discharged from the feeder and spreading a uniform bed of said coating material, a horizontal conveyor belt adapted to receive said bed of coating material, a spray nozzle adapted to sprinkle molten asphalt on said bed of coating material, an inclined screen adapted to receive the mixture of pelleted asphalt and excess coating material discharged from the conveyor belt and separate the pelleted asphalt therefrom, and conveyor belt means for reconveying the excess coating material to said storage bin.

6. An apparatus for forming pellets of asphalt which are coated with a powdered coating material of smaller than 100 mesh size, which comprises solids cooler means for cooling said coating material, a horizontal conveyor belt means for withdrawing cooled coating material from said cooler and depositing the cooled coating material in a bed of uniform thickness on said belt, a spray nozzle adapted to springle molten asphalt on said bed of coating material, said spray nozzle being located sufficiently far above said belt so that the molten asphalt breaks up into droplets before striking said bed, said bed being sufficiently deep to cover said droplets completely, cool them to form sticky pellets and provide a cushion therefor, and said belt being sufficiently long beyond the point at which the asphalt is applied to provide cooling of the coated pellets to a temperature sufficient to prevent agglomeration thereof, solids separator means for separating the coated pellets from the excess coating material, and solids conveyor means for recirculating the excess coating material to said solids cooler means.

7. An apparatus for forming pellets of asphalt which are coated with a powdered coating material of smaller than 100 mesh size, which comprises a substantially horizontal conveyor belt adapted to carry thereon a bed of said coating material, nozzle means for embedding droplets of hot molten asphalt in said bed, solids cooler means and solids distributor means for maintaining said bed sufficiently cool and sufficiently deep to cover said droplets completely, cool them to form sticky pellets, and provide a cushion therefor, solids separator means for separating the resulting coated pellets from the excess coating material, and solids conveyor means for recycling the excess coating material to said solids cooler means.

GILMAN B. MOLLRING.

REFERENCES CITED

The following references are of record in the file of this patent:

UNITED STATES PATENTS

| Number | Name | Date |
|---|---|---|
| 1,157,935 | Gray | Oct. 26, 1915 |
| 1,792,805 | Broderick | Feb. 17, 1931 |
| 1,998,055 | McBurney et al. | Apr. 16, 1935 |
| 2,265,303 | Moss | Dec. 9, 1941 |
| 2,294,523 | Veazey | Sept. 1, 1942 |
| 2,311,389 | Hawks et al. | Feb. 16, 1943 |
| 2,436,771 | Hood | Feb. 24, 1948 |

FOREIGN PATENTS

| Number | Country | Date |
|---|---|---|
| 284,704 | Great Britain | Sept. 13, 1928 |